United States Patent
Gallucci et al.

(10) Patent No.: US 8,263,691 B2
(45) Date of Patent: *Sep. 11, 2012

(54) RELEASE AGENT FOR TRANSPARENT POLYIMIDE BLENDS

(75) Inventors: Robert Russell Gallucci, Mt. Vernon, IN (US); Mark A. Sanner, Newburgh, IN (US); Rajendra Kashinath Singh, Evansville, IN (US)

(73) Assignee: Sabic Innovative Plastics IP B.V., Bergen Op Zoom (NL)

( * ) Notice: Subject to any disclaimer, the term of this patent is extended or adjusted under 35 U.S.C. 154(b) by 623 days.

This patent is subject to a terminal disclaimer.

(21) Appl. No.: 11/358,871

(22) Filed: Feb. 21, 2006

(65) Prior Publication Data

US 2007/0197700 A1 Aug. 23, 2007

(51) Int. Cl.
*C08K 5/00* (2006.01)

(52) U.S. Cl. .............. 524/227; 524/115; 524/210

(58) Field of Classification Search ........... 524/115, 524/227, 210
See application file for complete search history.

(56) References Cited

U.S. PATENT DOCUMENTS

| | | | | |
|---|---|---|---|---|
| 3,998,786 A * | 12/1976 | D'Alelio | | 526/70 |
| 4,184,997 A * | 1/1980 | Wu | | 524/494 |
| 4,352,904 A * | 10/1982 | Deyrup | | 524/292 |
| 4,548,997 A | 10/1985 | Mellinger et al. | | 525/433 |
| 4,554,302 A | 11/1985 | Miller | | |
| 4,673,708 A | 6/1987 | Rock et al. | | 525/66 |
| 4,687,819 A | 8/1987 | Quinn et al. | | 525/425 |
| 5,003,031 A * | 3/1991 | Schwartz et al. | | 528/188 |
| 5,387,639 A * | 2/1995 | Sybert et al. | | 524/537 |
| 5,391,689 A * | 2/1995 | Kageyama et al. | | 528/193 |
| 5,512,632 A * | 4/1996 | Serini et al. | | 525/67 |
| 5,521,258 A | 5/1996 | Cooper et al. | | 525/425 |
| 5,852,085 A | 12/1998 | Brown et al. | | 524/128 |
| 5,885,678 A * | 3/1999 | Malhotra | | 428/32.29 |
| 5,916,997 A | 6/1999 | Webb et al. | | 528/194 |
| 5,939,497 A | 8/1999 | Liao et al. | | 525/425 |
| 6,011,122 A | 1/2000 | Puyenbroek | | 525/425 |
| 6,063,874 A | 5/2000 | Jin et al. | | 525/390 |
| 6,150,473 A | 11/2000 | Brown et al. | | 525/423 |
| 6,265,522 B1 * | 7/2001 | Brunelle et al. | | 528/194 |
| 6,291,589 B1 | 9/2001 | Brunelle et al. | | 525/165 |
| 6,294,647 B1 | 9/2001 | Brunelle et al. | | 528/486 |
| 6,410,620 B2 * | 6/2002 | Shakhnovich | | 524/89 |
| 6,437,031 B1 | 8/2002 | Lensvelt et al. | | |
| 6,476,177 B2 * | 11/2002 | Auman et al. | | 528/170 |
| 6,538,065 B1 * | 3/2003 | Suriano et al. | | 525/182 |
| 6,559,270 B1 | 5/2003 | Siclovan et al. | | 528/196 |
| 6,607,814 B2 * | 8/2003 | Pickett et al. | | 428/212 |
| 6,753,365 B2 * | 6/2004 | Brown et al. | | 524/123 |
| 6,815,526 B2 * | 11/2004 | Yokota et al. | | 528/272 |
| 6,861,482 B2 | 3/2005 | Brunelle et al. | | 525/439 |
| 2003/0004268 A1 * | 1/2003 | Sundararaj et al. | | 525/100 |
| 2005/0165148 A1 * | 7/2005 | Bogerd et al. | | 524/403 |
| 2005/0288406 A1 | 12/2005 | Gallucci et al. | | 524/115 |
| 2007/0066737 A1 | 3/2007 | Gallucci et al. | | |

FOREIGN PATENT DOCUMENTS

| | | | |
|---|---|---|---|
| EP | 0330488 A1 | | 8/1989 |
| EP | 0594386 | * | 4/1994 |
| WO | WO 2005/035412 | | 4/2005 |

OTHER PUBLICATIONS

Flick, E.W. (1993). Plastics Additives—An Industrial Guide (2nd Edition). (pp. 47). William Andrew Publishing/Noyes.*
Harper, Charles A. Handbook of Building Materials for Fire Protection. (pp. 4.52). McGraw-Hill.*
U.S. Appl. No. 11/228,728, filed Sep. 16, 2005, Gallucci et al.
PCT International Search Report for International Application No. PCT/US2007/003848.
Extended European Search Report, EP 06111652.1, dated Aug. 18, 2006.

* cited by examiner

*Primary Examiner* — Ling Choi
*Assistant Examiner* — John Uselding
(74) *Attorney, Agent, or Firm* — Novak Druce + Quigg LLP

(57) ABSTRACT

Compositions made from a polyarylate or polyester carbonate containing greater than about 50 mole % resorcinol based ester linkages give miscible blends with polyimide resins, addition of alkyl amide compounds improves mold release and melt flow while maintaining transparency. The blends also have high refractive index and low haze.

22 Claims, No Drawings

RELEASE AGENT FOR TRANSPARENT POLYIMIDE BLENDS

FIELD OF THE INVENTION

This invention relates to miscible blends of polyimides with resorcinol based polyesters or resorcinol based polyester carbonate polymers and alkyl amide compounds. Such mixtures having improved melt flow, good mold release from metal tooling along with transparency and resistance to heat.

BACKGROUND OF THE INVENTION

Blending of polymers to make new compositions is well known. However finding polymer pairs that give useful mechanical properties is difficult. The unfavorable free energy of mixing for large polymeric molecules usually gives blends where the two polymers are separated from each other and have little or no affinity. These blends have poor mechanical properties and are not very useful for making molded articles or films. In some very limited instances two polymers show enough affinity to give sufficient adhesion between the two polymers such that blends with good mechanical properties are obtained. These are compatible blends. In very rare instances the polymers have sufficient affinity to overcome the unfavorable thermodynamics of mixing and form an intimate mixture where the two polymers are dissolved in one another. Such miscible blends are very useful in that they are transparent and often show good mechanical and rheological properties. Despite years of experimentation it is still very hard to predict, a priori, polymer miscibility.

However, even such miscible blends may still suffer from non-optimal performance in certain aspects of behavior such as mold release from metal tooling as well as the need for high flow. The combination of high flow and good release is especially important in making resin compositions for molding into long thin sections, for example electrical connectors, which need high flow, and due to the large surface area to volume, need good release characteristics so they will not stick and deform while being removed from the mold. In even more demanding applications such mixtures should also retain transparency, high refractive index (RI) and high heat resistance, for example as shown in percent transmission (% T>50%), RI greater than 1.60 and glass transition temperature (Tg)>180° C. respectively. Thus there is a need for transparent high heat resin which combine good melt flow, high heat and efficient release characteristics from the mold.

SUMMARY OF THE INVENTION

We have found that a surprisingly small change in aryl polyester and aryl polyester carbonate structures allows one to go from blends that are phase separated and opaque to blends that are fully miscible and transparent. Incorporation of aryl ester linkages based on resorcinol, rather than bisphenol A (BPA), gives polyester carbonates that are surprisingly miscible with polyimides, especially polyetherimides.

Even more surprising addition of certain alkyl amides in such blends gives higher flow and excellent mold release while still having high clarity and low haze.

Such miscible bends with polyimides are best achieved in compositions where the polyester carbonates or polyarylates contain at least about 50 mole % resorcinol based aryl ester linkages.

Blends further containing alkyl amides have exceptionally high melt flow and release along with a high glass transition temperature and high heat distortion (HDT) temperatures.

The miscible blends with the alkyl amide compounds show good optical properties with high percent transmittance. Color is reduced compared to the base polyimide resins and melt processability is improved.

DETAILED DESCRIPTION OF THE INVENTION

In one embodiment the composition will comprise a miscible polymer blend of:
  a) a resin selected from the group consisting of resorcinol based polyester carbonates, resorcinol based polyarylates and mixtures thereof,
  b) at least one alkyl amide compound with a molecular weight from 250 to 1000 and
  c) one or more polyimide resins,
wherein said polyester carbonates and polyarylates have at least 50 mole % aryl ester linkages derived from resorcinol, and wherein the composition has a percent transmission, as measured at 3.2 mm, using ASTM method D1003, of greater than or equal to 50%.

In another embodiment the composition will comprise 1 to 99% by weight of the entire mixture one or more of a resorcinol based polyarylate resin and 99 to 1 wt % of one or more polyimide resins. The resorcinol based polyarylate resin should contain at least about 50 mole % of units derived from the reaction product of resorcinol, or functionalized resorcinol, with an aryl dicarboxylic acid or dicarboxylic acid derivatives suitable for the formation of aryl ester linkages, for example, carboxylic acid halides, carboxylic acid esters and carboxylic acid salts.

In another embodiment the composition will have a percent transmittance of greater than or equal to about 65% and a glass transition temperature (Tg) of greater than or equal to about 180° C. The miscible polyetherimide—resorcinol based polyarylates or resorcinol based polyester carbonate blends with alkyl amide compounds will show high clarity and low haze and improved melt flow compared to the base polyimide—resorcinol based polyestercarbonate resin blends.

The resorcinol based polyarylate may further contain carbonate linkages derived from reaction of a bisphenol and a carbonate forming species, such as phosgene making a polyester carbonate copolymer.

In another embodiment of the invention resorcinol polyarylate carbonate copolymers will be comprised of the reaction products of iso and tere phthalic acid, resorcinol and optionally, bisphenol A and phosgene. In one aspect the resorcinol polyester carbonate copolymer will be made in such a way that the number of bisphenol dicarboxylic ester linkages is minimized, for example by pre-reacting the resorcinol moiety with the dicarboxylic acid moiety to form a polyester block and then reacting a said block with the bisphenol and carbonate moiety to form the polycarbonate part of the copolymer.

Some compositions of note will have 10 to 50% resorcinol based polyester with from 50 to 90% polyimide based on the weight of the whole blend composition.

In one of its aspects the composition of the present invention is comprised of polymers containing arylate polyester chain members. Said chain members comprise at least one diphenol residue in combination with at least one aromatic dicarboxylic acid residue. In one embodiment the diphenol residue is derived from a 1,3-dihydroxybenzene moiety, as illustrated in Formula I, commonly referred to throughout this specification as resorcinol or resorcinol moiety. Resorcinol or resorcinol moiety as used within the context of the present invention should be understood to include both unsubstituted 1,3-dihydroxybenzene and substituted 1,3-dihydroxybenzenes unless explicitly stated otherwise.

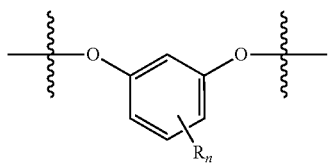

Formula I

In Formula I R is at least one of $C_{1-12}$ alkyl, $C_{6-24}$ aryl, alkyl aryl or halogen, and n is 0 to 3.

Suitable dicarboxylic acid residues include aromatic dicarboxylic acid residues derived from monocyclic moieties. In various embodiments suitable dicarboxylic acid residues include those derived from isophthalic acid, terephthalic acid, or mixtures of isophthalic and terephthalic acids. Suitable dicarboxylic acid residues also include those derived from polycyclic moieties, illustrative examples of which include diphenyl dicarboxylic acid, diphenylether dicarboxylic acid, and naphthalenedicarboxylic acid, especially naphthalene-2,6-dicarboxylic acid. In some embodiments the aromatic dicarboxylic acid residues are derived from mixtures of isophthalic and/or terephthalic acids as typically illustrated in Formula II.

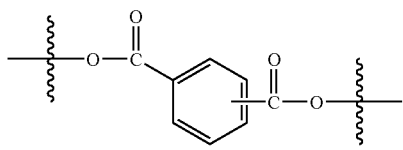

Formula II

Therefore, in one embodiment the present invention provides thermally stable polymers comprising resorcinol arylate polyester chain members as typically illustrated in Formula III wherein R and n are as previously defined:

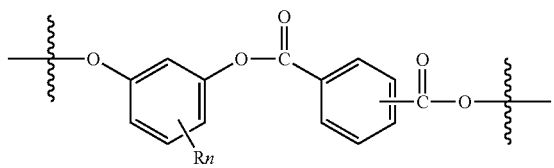

Formula III

In one of its aspects the present invention provides a composition made of a resin prepared using an interfacial polymerization method preparing polymers comprising resorcinol arylate polyester chain members substantially free of anhydride linkages, said method comprising a first step of combining at least one resorcinol moiety and at least one catalyst in a mixture of water and at least one organic solvent substantially immiscible with water. Suitable resorcinol moieties comprise units of Formula IV:

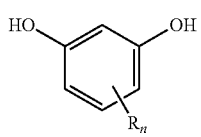

Formula IV wherein R is at least one of $C_{1-12}$ alkyl, $C_{6-24}$ aryl, alkyl aryl or halogen, and n is 0 to 3. Alkyl groups, if present, are typically straight-chain, branched, or cyclic alkyl groups, and are most often located in the ortho position to both oxygen atoms although other ring locations are contemplated. Suitable $C_{1-12}$ alkyl groups include, but are not limited to, methyl, ethyl, n-propyl, isopropyl, butyl, iso-butyl, t-butyl, hexyl, cyclohexyl, nonyl, decyl, and aryl-substituted alkyl, including benzyl. In a particular embodiment an alkyl group is methyl. Suitable halogen groups are bromo, chloro, and fluoro. The value for n in various embodiments may be 0 to 3, in some embodiments 0 to 2, and in still other embodiments 0 to 1. In one embodiment a resorcinol moiety is 2-methylresorcinol. In another embodiment the resorcinol moiety is an unsubstituted resorcinol moiety in which n is zero. The method further comprises combining at least one catalyst with the reaction mixture. Said catalyst may be present in various embodiments at a total level of 0.01 to 10 mole %, and in some embodiments at a total level of 0.2 to 6 mole % based on total molar amount of acid chloride groups. Suitable catalysts comprise tertiary amines, quaternary ammonium salts, quaternary phosphonium salts, hexaalkylguanidinium salts, and mixtures thereof. Suitable tertiary amines include triethylamine, dimethylbutylamine, diisopropylethylamine, 2,2,6,6-tetramethylpiperidine, and mixtures thereof. Other contemplated tertiary amines include N—$C_1$-$C_6$-alkyl-pyrrolidines, such as N-ethylpyrrolidine, N—$C_1$-$C_6$-piperidines, such as N-ethylpiperidine, N-methylpiperidine, and N-isopropylpiperidine, N—$C_1$-$C_6$-morpholines, such as N-ethylmorpholine and N-isopropyl-morpholine, N—$C_1$-$C_6$-dihydroindoles, N—$C_1$-$C_6$-dihydroisoindoles, N—$C_1$-$C_6$-tetrahydroquinolines, N—$C_1$-$C_6$-tetrahydroisoquinolines, N—$C_1$-$C_6$-benzo-morpholines, 1-azabicyclo-[3.3.0]-octane, quinuclidine, N—$C_1$-$C_6$-alkyl-2-azabicyclo-[2.2.1]-octanes, N—$C_1$-$C_6$-alkyl-2-azabicyclo-[3.3.1]-nonanes, and N—$C_1$-$C_6$-alkyl-3-azabicyclo-[3.3.1]-nonanes, N,N,N',N'-tetraalkylalkylene-diamines, including N,N,N',N'-tetraethyl-1,6-hexanediamine. In various embodiments tertiary amines are triethylamine and N-ethylpiperidine.

Suitable dicarboxylic acid dihalides may comprise aromatic dicarboxylic acid dichlorides derived from monocyclic moieties, illustrative examples of which include isophthaloyl dichloride, terephthaloyl dichloride, or mixtures of isophthaloyl and terephthaloyl dichlorides. Suitable dicarboxylic acid dihalides may also comprise aromatic dicarboxylic acid dichlorides derived from polycyclic moieties, illustrative examples of which include diphenyl dicarboxylic acid dichloride, diphenylether dicarboxylic acid dichloride, and naphthalenedicarboxylic acid dichloride, especially naphthalene-2,6-dicarboxylic acid dichloride; or from mixtures of monocyclic and polycyclic aromatic dicarboxylic acid dichlorides. In one embodiment the dicarboxylic acid dichloride comprises mixtures of isophthaloyl and/or terephthaloyl dichlorides as typically illustrated in Formula V.

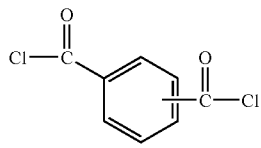

Formula V

Either or both of isophthaloyl and terephthaloyl dichlorides may be present. In some embodiments the dicarboxylic acid dichlorides comprise mixtures of isophthaloyl and terephthaloyl dichloride in a molar ratio of isophthaloyl to terephthaloyl of about 0.25 to 4.0:1; in other embodiments the molar ratio is about 0.4 to 2.5:1; and in still other embodiments the molar ratio is about 0.67 to 1.5:1.

Dicarboxylic acid halides provide only one method of preparing the polymers on the invention. Other routes to make the resorcinol arylate linkages are also contemplated using, for example, the dicarboxylic acid, a dicarboxylic acid ester, especially an activated ester, or dicarboxylate salts or partial salts.

At least one chain-stopper (also referred to sometimes hereinafter as capping agent) may also be present in the method and compositions of the invention. A purpose of adding at least one chain-stopper is to limit the molecular weight of polymer comprising resorcinol arylate polyester chain members, thus providing polymer with controlled molecular weight and favorable processability. Typically, at least one chain-stopper is added when the resorcinol arylate-containing polymer is not required to have reactive end-groups for further application. In the absence of chain-stopper resorcinol arylate-containing polymer may be either used in solution or recovered from solution for subsequent use such as in copolymer formation which may require the presence of reactive end-groups, typically hydroxy, on the resorcinol-arylate polyester segments. A chain-stopper may be at least one of mono-phenolic compounds, mono-carboxylic acid chlorides, and/or mono-chloroformates. Typically, the chain-stopper may be present in quantities of 0.05 to 10 mole %, based on resorcinol moieties in the case of mono-phenolic compounds or based on acid dichlorides in the case of mono-carboxylic acid chlorides and/or mono-chloroformates.

Suitable mono-phenolic compounds include monocyclic phenols, such as phenol, $C_1$-$C_{22}$ alkyl-substituted phenols, p-cumyl-phenol, p-tertiary-butyl phenol, hydroxy diphenyl; monoethers of diphenols, such as p-methoxyphenol. Alkyl-substituted phenols include those with branched chain alkyl substituents having 8 to 9 carbon atoms as described in U.S. Pat. No. 4,334,053. In some embodiments mono-phenolic chain-stoppers are phenol, p-cumylphenol, and resorcinol monobenzoate.

Suitable mono-carboxylic acid chlorides include monocyclic, mono-carboxylic acid chlorides, such as benzoyl chloride, $C_1$-$C_{22}$ alkyl-substituted benzoyl chloride, toluoyl chloride, halogen-substituted benzoyl chloride, bromobenzoyl chloride, cinnamoyl chloride, 4-nadimidobenzoyl chloride, and mixtures thereof; polycyclic, mono-carboxylic acid chlorides, such as trimellitic anhydride chloride, and naphthoyl chloride; and mixtures of monocyclic and polycyclic mono-carboxylic acid chlorides. The chlorides of aliphatic mono-carboxylic acids with up to 22 carbon atoms are also suitable. Functionalized chlorides of aliphatic monocarboxylic acids, such as acryloyl chloride and methacryoyl chloride, are also suitable. Suitable mono-chloroformates include monocyclic, mono-chloroformates, such as phenyl chloroformate, alkyl-substituted phenyl chloroformate, p-cumyl phenyl chloroformate, toluene chloroformate, and mixtures thereof.

A chain-stopper can be combined together with the resorcinol moieties, can be contained in the solution of dicarboxylic acid dichlorides, or can be added to the reaction mixture after production of a precondensate. If mono-carboxylic acid chlorides and/or mono-chloroformates are used as chain-stoppers, they are often introduced together with dicarboxylic acid dichlorides. These chain-stoppers can also be added to the reaction mixture at a moment when the chlorides of dicarboxylic acid have already reacted substantially or to completion. If phenolic compounds are used as chain-stoppers, they can be added in one embodiment to the reaction mixture during the reaction, or, in another embodiment, before the beginning of the reaction between resorcinol moiety and acid chloride moiety. When hydroxy-terminated resorcinol arylate-containing precondensate or oligomers are prepared, then chain-stopper may be absent, or only present in small amounts, to aid control of oligomer molecular weight.

In another embodiment the invention may encompass the inclusion of at least one branching agent such as a trifunctional or higher functional carboxylic acid chloride and/or trifunctional or higher functional phenol. Such branching agents, if included, can typically be used in quantities of 0.005 to 1 mole %, based on dicarboxylic acid dichlorides or resorcinol moieties used, respectively. Suitable branching agents include, for example, trifunctional or higher carboxylic acid chlorides, such as trimesic acid tri acid chloride, 3,3',4,4'-benzophenone tetracarboxylic acid tetrachloride, 1,4,5,8-naphthalene tetracarboxylic acid tetrachloride or pyromellitic acid tetrachloride, and trifunctional or higher phenols, such as 4,6-dimethyl-2,4,6-tri-(4-hydroxyphenyl)-2-heptene, 4,6-dimethyl-2,4,6-tri-(4-hydroxyphenyl)-heptane, 1,3,5-tri-(4-hydroxyphenyl)-benzene, 1,1,1-tri-(4-hydroxyphenyl)-ethane, tri-(4-hydroxyphenyl)-phenyl methane, 2,2-bis-[4,4-bis-(4-hydroxyphenyl)-cyclohexyl]-propane, 2,4-bis-(4-hydroxyphenylisopropyl)-phenol, tetra-(4-hydroxyphenyl)-methane, 2,6-bis-(2-hydroxy-5-methyl-benzyl)-4-methyl phenol, 2-(4-hydroxyphenyl)-2-(2,4-dihydroxyphenyl)-propane, tetra-(4-[4-hydroxyphenylisopropyl]-phenoxy)-methane, 1,4-bis-[(4,4-dihydroxytriphenyl)methyl]-benzene. Phenolic branching agents may be introduced first with the resorcinol moieties while acid chloride branching agents may be introduced together with acid dichlorides.

In one of its embodiments the invention comprises thermally stable resorcinol arylate polyesters made by the present method and substantially free of anhydride linkages linking at least two mers of the polyester chain. In a particular embodiment said polyesters comprise dicarboxylic acid residues derived from a mixture of iso- and terephthalic acids as illustrated in Formula VI:

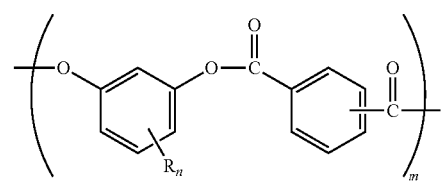

Formula VI wherein R is at least one of $C_{1-12}$ alkyl, $C_{6-24}$ aryl, alkyl aryl or halogen, n is 0 to 3, and m is at least about 8. In various embodiments n is zero and m is between about 10 and about 300. The molar ratio of isophthalate to terephthalate is in one embodiment about 0.25 to 4.0:1, in another embodiment about 0.4 to 2.5:1, and in still another embodiment about 0.67 to 1.5:1. Substantially free of anhydride linkages means that said polyesters show decrease in molecular weight in one embodiment of less than 30% and in another embodiment of less than 10% upon heating said polymer at a temperature of about 280 to 290° C. for five minutes.

Also included in the scope of this invention are resorcinol arylate copolyesters containing soft-block segments as disclosed in U.S. Pat. No. 5,916,997. The term soft-block as used herein, indicates that some segments of the polymers are made from non-aromatic monomer units. Such non-aromatic monomer units are generally aliphatic and are known to impart flexibility to the soft-block-containing polymers. The copolymers include those comprising structural units of Formulas I, VII, and VIII:

Formula I

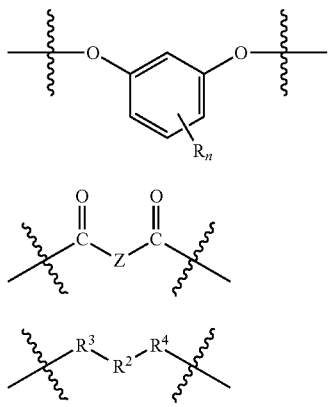

Formula VII

Formula VIII

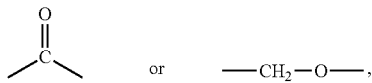

wherein R and n are as previously defined, Z is a divalent aromatic radical, $R^2$ is a $C_{3-20}$-straight chain alkylene, $C_{3-10}$ branched alkylene, or $C_{4-10}$ cyclo-or bicycloalkylene group, and $R^3$ and $R^4$ each independently represent

 or —CH$_2$—O—, wherein Formula VIII contributes from about 1 to about 45 mole percent to the ester linkages of the polyester. Additional embodiments of the present invention provide a composition wherein Formula VIII contributes in various embodiments from about 5 to about 40 mole percent to the ester linkages of the polyester, and in other embodiments from about 5 to about 20 mole percent to the ester linkages of the polyester. Another embodiment provides a composition wherein $R^2$ represents in one embodiment $C_{3-14}$ straight chain alkylene, or $C_{5-6}$ cycloalkylene, and in another embodiment $R^2$ represents $C_{3-10}$ straight-chain alkylene or $C_6$-cycloalkylene. Formula VII represents an aromatic dicarboxylic acid residue. The divalent aromatic radical Z in Formula VII may be derived in various embodiments from at least one of the suitable dicarboxylic acid residues as defined hereinabove, and in some embodiments at least one of 1,3-phenylene, 1,4-phenylene, or 2,6-naphthylene. In various embodiments Z comprises at least about 40 mole percent 1,3-phenylene. In various embodiments of copolyesters containing soft-block chain members n in Formula I is zero.

In various embodiments copolyesters containing resorcinol arylate chain members are those comprising from about 1 to about 45 mole % sebacate or cyclohexane-1,4-dicarboxylate units. In a particular embodiment a copolyester containing resorcinol arylate chain members is one comprising resorcinol isophthalate and resorcinol sebacate units in molar ratio between 8.5:1.5 and 9.5:0.5. In one embodiment said copolyester is prepared using sebacoyl chloride in combination with isophthaloyl dichloride.

In another of its embodiments the present invention comprises block copolyestercarbonates comprising resorcinol arylate-containing block segments in combination with organic carbonate block segments. The segments comprising resorcinol arylate chain members in such copolymers are substantially free of anhydride linkages. Substantially free of anhydride linkages means that the copolyestercarbonates show decrease in molecular weight in one embodiment of less than 10% and in another embodiment of less than 5% upon heating said copolyestercarbonate at a temperature of about 280 to 290° C. for five minutes. The block copolyestercarbonates include those comprising alternating arylate and organic carbonate blocks, typically as illustrated in Formula IX, wherein R and n are as previously defined, and $R^5$ is at least one divalent organic radical:

Formula IX

The arylate blocks have a degree of polymerization (DP), represented by m, in one embodiment of at least about 4, in another embodiment of at least about 10, in another embodiment of at least about 20 and in still another embodiment of about 30 to 150. The DP of the organic carbonate blocks, represented by p, is in one embodiment, generally at least about 2, in another embodiment, at least about 10 to 20 and in still another embodiment about 2 to 200. The distribution of the blocks may be such as to provide a copolymer having any desired weight proportion of arylate blocks in relation to carbonate blocks. In general, the content of arylate blocks is in one embodiment about 10 to 95% by weight and in another embodiment about 50 to 95% by weight.

Although a mixture of iso-and terephthalate is illustrated in Formula IX, the dicarboxylic acid residues in the arylate blocks may be derived from any suitable dicarboxylic acid residue, as defined hereinabove, or mixture of suitable dicarboxylic acid residues, including those derived from aliphatic diacid dichlorides (so-called "soft-block" segments). In various embodiments n is zero and the arylate blocks comprise dicarboxylic acid residues derived from a mixture of iso-and terephthalic acid residues, wherein the molar ratio of isophthalate to terephthalate is in one embodiment about 0.25 to 4.0:1, in another embodiment about 0.4 to 2.5:1, and in still another embodiment about 0.67 to 1.5:1.

In the organic carbonate blocks, each $R^5$ is independently a divalent organic radical. In various embodiments said radical comprises at least one dihydroxy-substituted aromatic hydrocarbon, and at least about 60 percent of the total number of $R^5$ groups in the polymer are aromatic organic radicals and the balance thereof are aliphatic, alicyclic, or aromatic radicals. Suitable $R^5$ radicals include m-phenylene, p-phenylene, 4,4'-biphenylene, 4,4'-bi(3,5-dimethyl)-phenylene, 2,2-bis(4-phenylene)propane, 6,6'-(3,3,3',3'-tetramethyl-1,1'-spirobi[1H-indan]) and similar radicals such as those which correspond to the dihydroxy-substituted aromatic hydrocarbons disclosed by name or formula (generic or specific) in U.S. Pat. No. 4,217,438.

In some embodiments each $R^5$ is an aromatic organic radical and in other embodiments a radical of Formula X:

-A$^1$-Y-A$^2$  Formula X wherein each A$^1$ and A$^2$ is a monocyclic divalent aryl radical and Y is a bridging radical in which one or two carbon atoms separate A$^1$ and A$^2$. The free valence bonds in Formula X are usually in the meta or para positions of A$^1$ and A$^2$ in relation to Y. Compounds in which $R^5$ has Formula X are bisphenols, and for the sake of brevity the term "bisphenol" is sometimes used herein to designate the dihydroxy-substituted aromatic hydrocarbons. It should be understood, however, that non-bisphenol compounds of this type may also be employed as appropriate.

In Formula X, $A^1$ and $A^2$ typically represent unsubstituted phenylene or substituted derivatives thereof, illustrative substituents (one or more) being alkyl, alkenyl, and halogen (particularly bromine). In one embodiment unsubstituted phenylene radicals are preferred. Both $A^1$ and $A^2$ are often p-phenylene, although both may be o-or m-phenylene or one o-or m-phenylene and the other p-phenylene.

The bridging radical, Y, is one in which one or two atoms, separate $A^1$ from $A^2$. In a particular embodiment one atom separates $A^1$ from $A^2$. Illustrative radicals of this type are —O—, —S—, —SO— or —SO$_2$—, methylene, cyclohexyl methylene, 2-[2.2.1]-bicycloheptyl methylene, ethylene, isopropylidene, neopentylidene, cyclohexylidene, cyclopentadecylidene, cyclododecylidene, adamantylidene, and like radicals.

In some embodiments gem-alkylene (commonly known as "alkylidene") radicals are preferred. Also included, however, are unsaturated radicals. In some embodiments the preferred bisphenol is 2,2-bis(4-hydroxyphenyl)propane (bisphenol-A or BPA), in which Y is isopropylidene and $A^1$ and $A^2$ are each p-phenylene. Depending upon the molar excess of resorcinol moiety present in the reaction mixture, $R^5$ in the carbonate blocks may at least partially comprise resorcinol moiety. In other words, in some embodiments of the invention carbonate blocks of Formula X may comprise a resorcinol moiety in combination with at least one other dihydroxy-substituted aromatic hydrocarbon.

Diblock, triblock, and multiblock copolyestercarbonates are encompassed in the present invention. The chemical linkages between blocks comprising resorcinol arylate chain members and blocks comprising organic carbonate chain members may comprise at least one of;

(a) an ester linkage between a suitable dicarboxylic acid residue of an arylate moiety and an —O—$R^5$—O— moiety of an organic carbonate moiety, for example as typically illustrated in Formula XI, wherein $R^5$ is as previously defined:

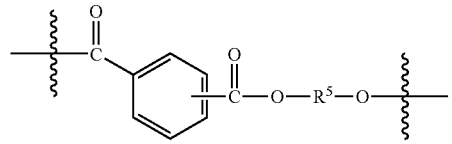

Formula XI and (b) a carbonate linkage between a diphenol residue of a resorcinol arylate moiety and a —C(=O)—O— moiety of an organic carbonate moiety as shown in Formula XII, wherein R and n are as previously defined:

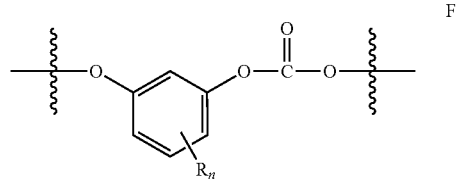

Formula XII

The presence of a significant proportion of ester linkages of the type (a) may result in undesirable color formation in the copolyestercarbonates. Although the invention is not limited by theory, it is believed that color may arise, for example, when $R^5$ in Formula XI is bisphenol A and the moiety of Formula XI undergoes Fries rearrangement during subsequent processing and/or light-exposure. In one embodiment the copolyestercarbonate is substantially comprised of a diblock copolymer with a carbonate linkage between resorcinol arylate block and an organic carbonate block. In another embodiment the copolyestercarbonate is substantially comprised of a triblock carbonate-ester-carbonate copolymer with carbonate linkages between the resorcinol arylate block and organic carbonate end-blocks.

Copolyestercarbonates with at least one carbonate linkage between a thermally stable resorcinol arylate block and an organic carbonate block are typically prepared from resorcinol arylate-containing oligomers prepared by various embodiments of the invention and containing in one embodiment at least one and in another embodiment at least two hydroxy-terminal sites. Said oligomers typically have weight average molecular weight in one embodiment of about 10,000 to about 40,000, and in another embodiment of about 15,000 to about 30,000. Thermally stable copolyestercarbonates may be prepared by reacting said resorcinol arylate-containing oligomers with phosgene, at least one chain-stopper, and at least one dihydroxy-substituted aromatic hydrocarbon in the presence of a catalyst such as a tertiary amine.

Examples of resorcinol ester containing polymers can be found in U.S. Pat. Nos. 6,861,482, 6,559,270, 6,265,522, 6,294,647, 6,291,589 and 5,916,997.

Alkyl amide compounds can be of any structure and any effective amount to reduce mold release pressure while maintaining transparency and having suitable melt processability. That is parts can be molded with no splay or other blemishes. Formulas XIII and XIV are examples of alkyl amides.

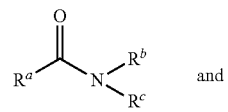

Formula XIII and

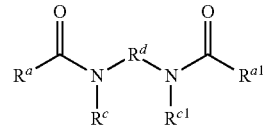

Formula XIV wherein $R^a$ or $R^{a1}$ are a $C_1$ to $C_{30}$ alkyl group and $R^b$, $R^c$ and $R^{c1}$ are independently H or a $C_1$ to $C_{30}$ alkyl group and $R^d$ is a $C_2$ to $C_6$ alkyl group.

The alkyl groups can be linear or branched; they may also be monocyclic, bicyclic or polycyclic. The alkyl groups may further contain one or more double bonds. Any mixture of the same or different alkyl groups can be present in the alkyl amide compound. Mixtures of two or more alkyl amides can also be employed. Examples of alkyl amides are the primary amides, the $C_1$ to $C_6$ N-alkyl amides and the, $C_1$ to $C_6$ secondary amides of; linear or branched $C_{12-36}$ alkyl carboxylic acids. Alkyl amides can be made by reaction of ammonia, mono-amines, diamines or mixture thereof with carboxylic acids. Examples of carboxylic acids are; erucic acid, stearic acid, oleic acid, linoleic acid, linolenic acid, myristic acid, palmitic acid, arachidonic acid, behenic acid, lignoceric acid, tridecanoic acid, elaidic acid, and mixtures thereof. Alkyl amides can include the $C_{6-20}$ bis amides of $C_{2-6}$ alkylene diamines and mixtures containing any of the foregoing carboxylic acids.

Some alkyl amides will have a molecular weight of from about 250 to about 1000. In other instances the alkyl amide will have a molecular weight of from 300 to 700. Molecular weight can be determined from the chemical structure of the alkyl amide. If the molecular weight is too low the alkyl amide may be lost from the resin mixture during melt processing by boiling or sublimation. If the alkyl amide molecular weight is too high the alkyl amide may separate from the resin mixture causing haze and/or loss of transparency.

Suitable thermoplastic polyimides have the general formula (XV)

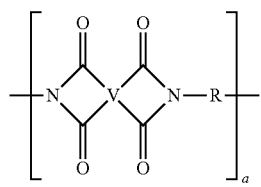
(XV)

wherein a is more than 1, typically about 10 to about 1000 or more, and more preferably about 10 to about 500; and wherein V is a tetravalent linker without limitation, as long as the linker does not impede synthesis or use of the polyimide. Suitable linkers include but are not limited to: (a) substituted or unsubstituted, saturated, unsaturated or aromatic monocyclic and polycyclic groups having about 5 to about 50 carbon atoms, (b) substituted or unsubstituted, linear or branched, saturated or unsaturated alkyl groups having 1 to about 30 carbon atoms; or combinations thereof. Suitable substitutions and/or linkers include, but are not limited to, ethers, amides, esters, and combinations thereof. Preferred linkers include but are not limited to tetravalent aromatic radicals of formula (XVI), such as

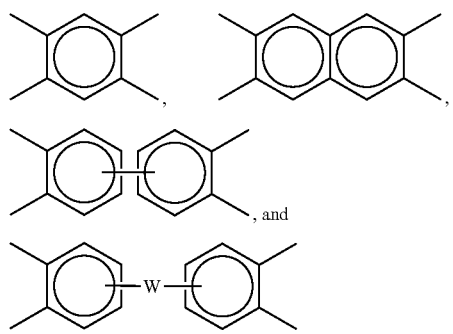
(XVI)

wherein W is a divalent moiety selected from the group consisting of —O—, —S—, —C(O)—, —SO$_2$—, —SO—, —C$_y$H$_{2y}$— (y being an integer from 1 to 5), and fluoronated derivatives thereof, including perfluoroalkylene groups, or a group of the formula —O—Z—O— wherein the divalent bonds of the —O— or the —O—Z—O— group are in the 3,3', 3,4', 4,3', or the 4,4' positions, and wherein Z includes, but is not limited, to divalent radicals of formula (XVII).

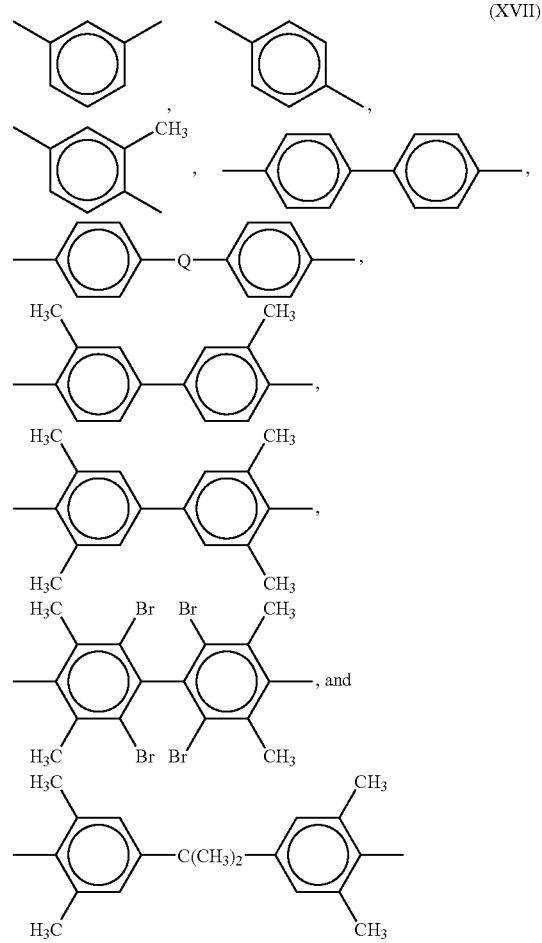
(XVII)

R in formula (XV) includes but is not limited to substituted or unsubstituted divalent organic radicals such as: (a) aromatic hydrocarbon radicals having about 6 to about 20 carbon atoms and halogenated derivatives thereof; (b) straight or branched chain alkylene radicals having about 2 to about 20 carbon atoms; (c) cycloalkylene radicals having about 3 to about 20 carbon atoms, or (d) divalent radicals of the general formula (XVIII)

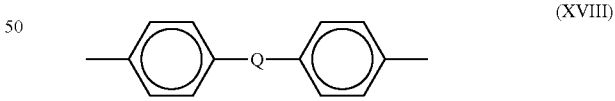
(XVIII)

wherein Q includes but is not limited to a divalent moiety selected from the group consisting of —O—, —S—, —C(O)—, —SO$_2$—, —SO—, —C$_y$H$_{2y}$— (y being an integer from 1 to 5), and fluorinated derivatives thereof, including perfluoroalkylene groups.

Preferred classes of polyimides include polyamidimides and polyetherimides, particularly those polyetherimides known in the art that are melt processable, such as those whose preparation and properties are described in U.S. Pat. Nos. 3,803,085 and 3,905,942.

Preferred polyetherimide resins comprise more than 1, typically about 10 to about 1000 or more, and more preferably about 10 to about 500 structural units, of the formula (XIX)

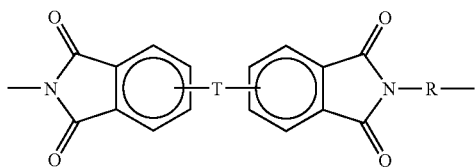
(XIX)

wherein T is —O— or a group of the formula —O—Z—O— wherein the divalent bonds of the —O— or the —O—Z—O— group are in the 3,3', 3,4', 4,3', or the 4,4' positions, and wherein Z includes, but is not limited to, divalent radicals of formula (XV) as defined above.

In one embodiment, the polyetherimide may be a copolymer, which, in addition to the etherimide units described above, further contains polyimide structural units of the formula (XX)

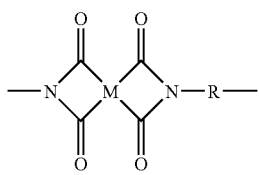
(XX)

wherein R is as previously defined for formula (XV) and M includes, but is not limited to, radicals of formula (XXI).

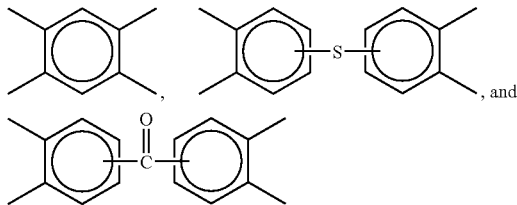
(XXI)

The polyetherimide can be prepared by any of the methods well known to those skilled in the art, including the reaction of an aromatic bis(ether anhydride) of the formula (XXII)

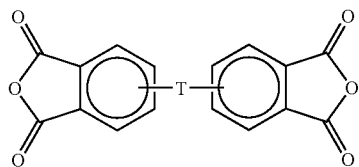
(XXII)

with an organic diamine of the formula (XXIII)

$$H_2N-R-NH_2$$ (XXIII)

wherein T and R are defined as described above in formulas (XV) and (XVIII).

Examples of specific aromatic bis(ether anhydride)s and organic diamines are disclosed, for example, in U.S. Pat. Nos. 3,972,902 and 4,455,410, which are incorporated herein by reference. Illustrative examples of aromatic bis(ether anhydride)s of formula (XXII) include: 3,3-bis[4-(3,4-dicarboxyphenoxy)phenyl]propane dianhydride; 4,4'-bis(3,4-dicarboxyphenoxy)diphenyl ether dianhydride; 4,4'-bis(3,4-dicarboxyphenoxy)diphenyl sulfide dianhydride; 4,4'-bis(3,4-dicarboxyphenoxy)benzophenone dianhydride; 4,4'-bis(3,4-dicarboxyphenoxy)diphenyl sulfone dianhydride; 2,2-bis[4-(2,3-dicarboxyphenoxy)phenyl]propane dianhydride; 4,4'-bis(2,3-dicarboxyphenoxy)diphenyl ether dianhydride; 4,4'-bis(2,3-dicarboxyphenoxy)diphenyl sulfide dianhydride; 4,4'-bis(2,3-dicarboxyphenoxy)benzophenone dianhydride; 4,4'-bis(2,3-dicarboxyphenoxy)diphenyl sulfone dianhydride; 4-(2,3-dicarboxyphenoxy)4'-(3,4-dicarboxyphenoxy)diphenyl-2,2-propane dianhydride; 4-(2,3-dicarboxyphenoxy)$_4$'-(3,4-dicarboxyphenoxy)diphenyl ether dianhydride; 4-(2,3-dicarboxyphenoxy)$_4$'-(3,4-dicarboxyphenoxy)diphenyl sulfide dianhydride; 4-(2,3-dicarboxyphenoxy)$_4$'-(3,4-dicarboxyphenoxy)benzophenone dianhydride and 4-(2,3-dicarboxyphenoxy)$_4$'-(3,4-dicarboxyphenoxy)diphenyl sulfone dianhydride, as well as various mixtures thereof.

The bis(ether anhydride)s can be prepared by the hydrolysis, followed by dehydration, of the reaction product of a nitro substituted phenyl dinitrile with a metal salt of dihydric phenol compound in the presence of a dipolar, aprotic solvent. A preferred class of aromatic bis(ether anhydride)s included by formula (XXII) above includes, but is not limited to, compounds wherein T is of the formula (XXIV)

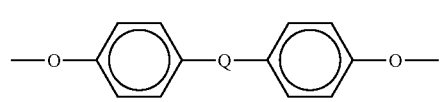
(XXIV)

and the ether linkages, for example, are preferably in the 3,3', 3,4', 4,3', or 4,4' positions, and mixtures thereof, and where Q is as defined above.

Any diamino compound may be employed in the method of this invention. Examples of suitable compounds are ethylenediamine, propylenediamine, trimethylenediamine, diethylenetriamine, triethylenetertramine, hexamethylenediamine, heptamethylenediamine, octamethylenediamine, nonamethylenediamine, decamethylenediamine, 1,12-dodecanediamine, 1,18-octadecanediamine, 3-methylheptamethylenediamine, 4,4-dimethylheptamethylenediamine, 4-methylnonamethylenediamine, 5-methylnonamethylenediamine, 2,5-dimethylhexamethylenediamine, 2,5-dimethylheptamethylenediamine, 2,2-dimethylpropylenediamine, N-methyl-bis (3-aminopropyl)amine, 3-methoxyhexamethylenediamine, 1,2-bis(3-aminopropoxy)ethane, bis(3-aminopropyl)sulfide, 1,4-cyclohexanediamine, bis-(4-aminocyclohexyl) methane, m-phenylenediamine, p-phenylenediamine, 2,4-diaminotoluene, 2,6-diaminotoluene, m-xylylenediamine, p-xylylenediamine, 2-methyl4,6-diethyl-1,3-phenylene-diamine, 5-methyl4,6-diethyl-1,3-phenylene-diamine, benzidine, 3,3'-dimethylbenzidine, 3,3'-dimethoxybenzidine, 1,5-diaminonaphthalene, bis(4-aminophenyl) methane, bis(2-chloro-4-amino-3,5-diethylphenyl)methane, bis(4-aminophenyl)propane, 2,4-bis (b-amino-t-butyl) toluene, bis(p-b-amino-t-butylphenyl) ether, bis(p-b-methyl-o-aminophenyl)benzene, bis(p-b-methyl-o-aminopentyl)benzene, 1,3-diamino-4-isopropylbenzene, bis(4-aminophenyl)sulfide, bis (4-aminophenyl)sulfone, bis(4-aminophenyl)ether and 1,3-bis(3-aminopropyl) tetramethyldisiloxane. Mixtures of these compounds may also be present. The preferred diamino compounds are aromatic diamines, especially m- and p-phenylenediamine, sulfonyl dianiline and mixtures thereof.

In one embodiment, the polyetherimide resin comprises structural units according to formula (V) wherein each R is independently p-phenylene or m-phenylene or a mixture thereof and T is a divalent radical of the formula (XXV)

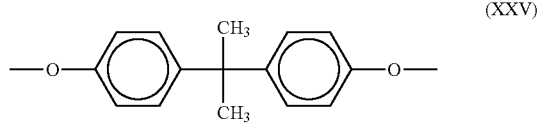
(XXV)

Included among the many methods of making the polyimides, particularly polyetherimides, are those disclosed in U.S. Pat. Nos. 3,847,867, 3,850,885, 3,852,242, 3,855,178, 3,983,093, and 4,443,591. These patents mentioned for the purpose of teaching, by way of illustration, are general and specific methods for preparing polyimides.

Some polyetherimides have a melt index of about 0.1 to about 20 grams per minute (g/min), as measured by American Society for Testing Materials (ASTM) D1238 at 340 to 370° C., using a 6.6 kilogram (kg) weight. In a one embodiment, the polyetherimide resin has a weight average molecular weight (Mw) of about 10,000 to about 150,000 grams per mole (g/mole), as measured by gel permeation chromatography, using a polystyrene standard. In another embodiment the polyetherimide has Mw of 20,000 to 60,000. Such polyetherimide resins typically have an intrinsic viscosity greater than about 0.2 deciliters per gram (dl/g), preferably about 0.35 to about 0.7 dl/g measured in m-cresol at 25° C.

Examples of some polyetherimides useful in blends described herein are listed in ASTM D5205-96 "Standard Classification System for Polyetherimide (PEI) Materials.

Polyimide can be present in amounts of about 1 to about 99 weight percent, based on the total weight of the composition. Within this range, the amount of polyimide may be greater than or equal to about 20, more specifically greater than or equal to about 50, and even more specifically greater than or equal to about 70 weight percent. Also within this range, the amount of polyimide may be less than or equal to about 90, more specifically less than or equal to about 80 and even more specifically less than or equal to about 75 weight percent.

In another embodiment a composition comprising a miscible polymer blend of;
 a) 1 to 99% by weight of one or more polyetherimide resins,
 b) 99 to 1% by weight of one or more aryl polyester resin containing at least 50 mole % resorcinol linkages,
 c) 0.01 to 5.0% by weight of at least one alkyl amide compound,
 d) 0 to 40% by weight of one or more aryl alkyl polyesters and
 e) 0 to 2% by weight of one or more phosphorus containing stabilizers,
is contemplated.
In other aspect a composition comprising a miscible polymer blend of;
 a) 50 to 99% by weight of one or more polyetherimide resins,
 b) 1 to 50% by weight of one or more aryl polyester carbonate resin containing at least 50 mole % resorcinol linkages,
 c) 0.05 to 3.0% by weight of at least one alkyl amide compound,
 d) 0 to 40% by weight of one or more aryl alkyl polyester resins and
 e) 0 to 2% by weight of one or more phosphorus containing stabilizers,
is contemplated.

In some embodiments the polymer blends will have a refractive index (RI), as measured by ASTM method D542, of at least 1.60. In other instances the refractive index will be from 1.650 to 1.680. In still other instances the refractive index will be from 1.650 to 1.670. Such transparent high refractive index resins are used in the design of efficient optical devices to focus light, especially in high temperature applications.

The addition of alkyl amide to the polyimide blends with resorcinol derived polyester carbonates and polyarylates also give surprisingly good melt flow. The melt flow, as measured by ASTM method D1238 at 337° C., can be greater than 20 g/10 min. In other embodiments it can be from 30 to 150 g/10 min. This can be achieved with a high percent transmittance of greater than 50%, while still having a high glass transition temperature. In some instances Tg, as measured by ASTM method D 3418, will be greater than 180° C.

The blends of alkyl amide compounds with polyimide resins and resorcinol derived polyester carbonates and polyarylates may further comprise a thermoplastic polyester resin. The polyester resin can include crystalline polyesters such as polyesters derived from aliphatic diols, or mixtures thereof, containing from 2 to about 6 carbon atoms and at least one aromatic dicarboxylic acid. Preferred polyesters are derived from an aliphatic diol and an aromatic dicarboxylic acid having repeating units of the following general formula XXVI:

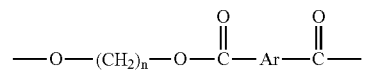
Formula XXVI wherein n is an integer of from 2 to 6. Ar is a $C_6$-$C_{20}$ aryl radical comprising a decarboxylated residue derived from an aromatic dicarboxylic acid.

Examples of aromatic dicarboxylic acids represented by the decarboxylated residue Ar are isophthalic or terephthalic acid, 1,2-di(p-carboxyphenyl)ethane, 4,4'-dicarboxydiphenyl ether, 4,4' bisbenzoic acid and mixtures thereof. All of these acids contain at least one aromatic nucleus. Acids containing fused rings can also be present, such as in 1,4-1,5- or 2,6-naphthalene dicarboxylic acids. The preferred dicarboxylic acids are terephthalic acid, isophthalic acid, naphthalene dicarboxylic acid or mixtures thereof.

Preferred polyesters are poly(ethylene terephthalate) (PET), and poly(butylene terephthalate) (PBT), poly(ethylene naphthanoate) (PEN), poly(butylene naphthanoate) (PBN), poly(propylene terephthalate) (PPT) or mixtures of these resins. Blends of polyesters may also be employed in the composition. Other polyesters blends contain poly(ethylene terephthalate). In some instances the polyester resin may be present in the blend from 1 to 40 weight % of the total composition.

In other embodiments the blends of alkyl amide with polyimide and resorcinol derived polyester carbonates and polyarylates may further comprise at least one phosphorus containing stabilizer. In one instance the phosphorus containing stabilizer is a phosphonite wherein one of the phosphorus bonds is attached directly to an aryl radical. Examples of such compounds are presented in U.S. Pat. No. 4,075,163. Suitable compounds may be represented by the phosphonite formulas XXVII and XXVIII

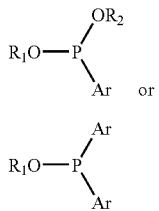

Formula XXVII

Formula XXVIII where $R_1$, $R_2$ is alkyl, aryl, alkylaryl, alkyl substituted, preferably an aryl group of 6 to 30 carbon atoms or an alkyl of 1 to 30 carbon atoms, and Ar is an aryl group for example phenyl, naphthyl, biphenyl, terphenyl, etc.

Other phosphonites are difunctional containing two phosphonite groups bonded to the aryl group, see formula XXIX below:

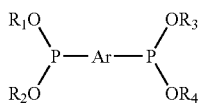

Formula XXIX wherein $R_1$, $R_2$, $R_3$, $R_4$ are alkyl and aryl groups as previously discussed and can be the same or different. Still other aryl phosphonites $R_1$, $R_2$, $R_3$, $R_4$ have are derived from alkylated phenols and in other instances the Ar group is derived from biphenyl. A preferred phosphonite is tetrakis(2,4-di-tert-butylphenyl)4,4'-biphenylene diphosphonite (SANDOSTAB PEPQ from Clariant Chemicals).

Further examples of phosphorus containing stabilizers are tri-aryl phosphite stabilizers of the following formula XXX:

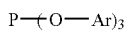

Formula XXX

Ar may be as described above with preferred structures including alkylaryl groups. Commercially available tri-aryl phosphites include tris(nonylphenyl)phosphite, triphenyl phosphite, t-butyl phenyl phosphite and tris(2,4-di-tert-butylphenyl)phosphite available from Ciba-Geigy as IRGAPHOS 168 and as set forth in U.S. Pat. No. 4,187,212. Generally, Ar is independently chosen from aryl or substituted aryl groups. Aryl groups may be substituted with alkyl, aryl, halogen or ether groups. Alkyl aryl substituted groups are most preferred. Combinations of one or more phosphite with one or more phosphonite stabilizers may be of particular note as effective in reducing the formation of color on melt processing.

The compositions of the invention can also be combined with various additives including, but not limited to, colorants such a dyes; stabilizers such as hindered phenols, phosphites, phosphonites, thioesters and mixtures thereof, as well as, lubricants and flame retardants. Ultraviolet light stabilizers can also be added to the compositions in effective amounts. These additives are known in the art, as are their effective levels and methods of incorporation. Effective amounts of the additives vary widely, but they are usually present in an amount up to about 0.01 to 30% or more by weight, based on the weight of the entire composition.

Flame retardants based on sulfonate salts, such a perfluoro alky metal sulfonates, aryl sulfonate salts or mixtures thereof may be useful. Bromo or chloro compounds can also be employed as flame retardants in some instances. Other flame retardant additives, for example phosphate esters, sulfonate salts and halogenated aromatic compounds may also be employed. Mixtures of any or all of these flame retardants may also be used. Examples of halogenated aromatic compounds, are brominated phenoxy resins, halogenated polystyrenes, halogenated imides, brominated polycarbonates, brominated epoxy resins and mixtures thereof. Examples of sulfonate salts are potassium perfluoro butyl sulfonate, sodium tosylate, sodium benzene sulfonate, sodium dichloro phenyl benzene sulfonate, potassium diphenyl sulfone sulfonate and sodium methane sulfonate. In some instances sulfonate salts of alkaline and alkaline earth metals are preferred. Examples of phosphate flame retardants are tri aryl phosphates, tri cresyl phosphate, triphenyl phosphate, bisphenol A phenyl diphosphates, resorcinol phenyl diphosphates, phenyl-bis-(3,5,5'-trimethylhexyl phosphate), ethyl diphenyl phosphate, bis(2-ethylhexyl)-p-tolyl phosphate, bis(2-ethylhexyl)-phenyl phosphate, tri(nonylphenyl)phosphate, phenyl methyl hydrogen phosphate, di(dodecyl)-p-tolyl phosphate, halogenated triphenyl phosphates, dibutyl phenyl phosphate, 2-chloroethyldiphenyl phosphate, p-tolyl bis(2,5,5'-trimethylhexyl)phosphate, 2-ethylhexyldiphenyl phosphate, diphenyl hydrogen phosphate, resorcinol diphosphate and the like.

In some instances it maybe desired to have flame retardant compositions that are essentially free of halogen atoms, especially bromine and chlorine. Essentially free of halogen atoms means that in some embodiments the composition has less than about 3% halogen by weight of the composition and in other embodiments less than about 1% halogen by weight of the composition. The amount of halogen atoms can be determined by ordinary chemical analysis.

The compositions of the present invention can be blended with the aforementioned ingredients by a variety of methods involving intimate admixing of the materials with any additional additives desired in the formulation. A preferred procedure includes melt blending, although solution blending is also possible. Because of the availability of melt blending equipment in commercial polymer processing facilities, melt processing methods are generally preferred. Illustrative examples of equipment used in such melt processing methods include: co-rotating and counter-rotating extruders, single screw extruders, co-kneaders and various other types of extrusion equipment. The temperature of the melt in the present process is preferably minimized in order to avoid excessive degradation of the resins. It is often desirable to maintain the melt temperature between about 250° C. and about 370° C. in the molten resin composition, although higher temperatures can be used provided that the residence time of the resin in the processing equipment is kept short. In some embodiments the melt processed composition exits processing equipment such as an extruder through small exit holes in a die, and the resulting strands of molten resin are cooled by passing the strands through a water bath. The cooled strands can be chopped into small pellets for packaging and further handling.

The compositions of the invention can be formed into articles by any number of methods. Preferred methods include, for example, injection molding, compression molding, profile extrusion, sheet or film extrusion, gas assist molding, structural foam molding, machining and thermoforming. Examples of such articles include, but are not limited to, cookware, food service items, medical devices, trays, plates, handles, helmets, animal cages, electrical connectors, enclosures for electrical equipment, engine parts, automotive engine parts, lighting sockets and reflectors, electric motor parts, power distribution equipment, communication equipment, computers and the like, including devices that have molded in snap fit connectors. Other articles of note are optical connectors, sensors, filter bowls, sight glasses, films, light pipes and lenses The resorcinol polyarylate based blends described herein resins can also be made into film and sheet as well as components of laminate systems.

Without further elaboration, it is believed that one skilled in the art can, using the description herein, utilize the present invention. The following examples are included to provide additional guidance to those skilled in the art of practicing the claimed invention. The examples provided are merely representative of the work and contribute to the teaching of the present invention. Accordingly, these examples are not intended to limit the invention in any manner.

All patents cited herein are incorporated by reference.

EXAMPLES OF THE INVENTION

Blends were prepared by extrusion of mixtures of resorcinol based polyester carbonate resin with polyetherimide and alkyl amide release agent in a 2.5 inch single screw, vacuum vented extruder. All compositions are listed in wt % of the total composition. The extruder was set at about 285 to 340° C. The blends were run at about 90 ppm under vacuum. The extrudate was cooled, pelletized and dried at 120° C. Test samples were injection molded at a set temperature of 340-350° C. and mold temperature of 120° C. using a 30 sec. cycle time. Properties were measured using ASTM test methods. Melt flow index (MFI) was run on dried pellets as per ASTM D1238 at 337° C. using a 6.7 Kg weight. All molded samples were conditioned for at least 48 h at 50% relative humidity prior to testing. Tg was measured by differential scanning calorimetry on the second scan with a heating rate of 20° C./min. using ASTM method D3418. Heat distortion temperature (HDT) was measured at 0.45 and 1.82 MPa on 3.2 mm thick bars as per ASTM D648. Percent transmission (% T) and percent haze (% H) were measured as per ATM D1003 on 3.2 mm injection molded parts. Yellowness index (YI) was measured on 3.2 mm injection molded chips as per ASTM method D6290. Tensile properties were measured as per ASTM method D638 on 3.2 mm bars. Flexural properties were measured as per ASTM method D790 also on 3.2 mm bars. Refractive index (RI) was measured on as molded parts at room temperature as per ASTM method D542 using a wavelength of 587.6 nm on an Abbe refractometer. Note that letters designate comparative examples while numbers designate examples of the invention.

Materials

Iso/tere phthalate resorcinol ester co-polycarbonate (ITR) resins are polymers made from the condensation of a 1 to 1 mixture of iso and terephthaloyl chloride with resorcinol, bisphenol A (BPA) and phosgene.

The polymers are named by the approximate mole ratio of ester linkages to carbonate linkages. ITR9010 has about 81 mole % resorcinol ester linkages, 8 mole % resorcinol carbonate linkages and about 11 mole % BPA carbonate linkages. Tg is 131° C. PEI is ULTEM 1010 polyetherimide made by reaction of m-phenylene diamine and bisphenol A dianhydride, from GE Plastics. Aryl phosphite is tris (di-tert-butyl phenyl phosphite), IRGAPHOS 168, from Ciba Geigy Co. Aryl phosphonite is PEPQ from Clariant Co. Erucamide, or docosenic amide, was KENAMIDE-E from Crompton Co. Molecular weight is about 335. Ethylene bis stearamide, or EBS, was Kemamide W40 from Crompton Co. Molecular weight is about 620. Pentaerythritol tetrastearate, or PETS, has a molecular weight of 1256.

Examples A, 1-5 (Table 1) show blends of PEI with 40% ITR 9010 along with examples containing erucamide and EBS alkyl amide compounds. The ITR 9010-PEI blends with added alkyl amide, examples 1 to 5, were all clear, showing a % T of over 65% and a % H below 5. In addition examples 1 to 5 show improvement in melt flow, at 337° C., of from 10.2 to 45.6% compared to the blend with no alkyl amide (Example A). Even very low levels (0.1 to 0.3 wt. %) of alkyl amide are effective in improving flow. Also note the reduction in color, as measured by YI, in alkyl amide blends examples 1 to 4.

TABLE 1

|  | Unit | A | 1 | 2 | 3 | 4 | 5 |
| --- | --- | --- | --- | --- | --- | --- | --- |
| ITR 9010 | Wt % | 40.0% | 40.0% | 40.0% | 40.0% | 40.0% | 40.0% |
| PEI 1010 | Wt % | 59.8% | 59.75% | 59.70% | 59.65% | 59.60% | 59.50% |
| Aryl phosphite | Wt % | 0.10% | 0.10% | 0.10% | 0.10% | 0.10% | 0.10% |
| Aryl phosphonite | Wt % | 0.10% | 0.10% | 0.10% | 0.10% | 0.10% | 0.10% |
| Erucamide | Wt % |  | 0.05% | 0.10% | 0.15% | 0.20% |  |
| EBS Wax | Wt % |  |  |  |  |  | 0.30% |
| Tg | deg C. | 183 | 182 | 182 | 182 | 180 | 180 |
| Transmission (% T) | % | 71.4 | 72.9 | 72.1 | 72.6 | 72.4 | 69.5 |
| Yellowness Index (YI) |  | 61.8 | 59.2 | 60.6 | 59.5 | 58.8 | 65.5 |
| Haze (% H) | % | 3.0 | 2.8 | 2.9 | 3.2 | 4.3 | 4.6 |
| Appearance |  | Transparent | Transparent | Transparent | Transparent | Transparent | Transparent |
| MFR, 337 C., 6.7 kgf | g/10 min | 68.7 | 75.7 | 79.0 | 85.4 | 91.7 | 100.0 |
| Change in MFR | % | 0.0% | 10.2% | 15.0% | 24.2% | 33.5% | 45.6% |

In order to test mold release the examples of table 1 were injection molded on an 85 ton injection molding machine using a square four sided box mold. The box was 78 mm wide, 37 mm deep with a 3.2 mm wall thickness. The part was center gated. Molding was done using a cavity pressure of 35 Mpa, a melt temperature of 340° C., a mold temperature of 120° C. and a 48 second cycle time. The force need to eject the box off the mold was measured for each resin (Table 2). The ejection force, measured in psi, was compared to the PEI-ITR9010 blend (example A) with no alkyl amide added. The percent reduction (improvement) in ejection force verses the example A was also calculated.

TABLE 2

|  | A | 1 | 2 | 3 | 4 | 5 |
|---|---|---|---|---|---|---|
| ITR 9010 | 40.0% | 40.0% | 40.0% | 40.00% | 40.0% | 40.0% |
| PEI 1010 | 59.8% | 59.75% | 59.70% | 59.65% | 59.60% | 59.50% |
| Aryl phosphite | 0.10% | 0.10% | 0.10% | 0.10% | 0.10% | 0.10% |
| Aryl phosphonite | 0.10% | 0.10% | 0.10% | 0.10% | 0.10% | 0.10% |
| Erucamide |  | 0.05% | 0.10% | 0.15% | 0.20% |  |
| EBS Wax |  |  |  |  |  | 0.30% |
| Ejection Pressure psi | 1957 | 1466 | 1267 | 1201 | 1181 | 1300 |
| % Reduction | 0 | 25.1% | 35.3% | 38.7% | 39.7% | 33.6% |

In these examples the alkyl amide compounds reduce ejection pressure by 25.1 to 39.7% while improving flow and maintaining clarity.

Table 3 shows examples of transparent blends of 30% ITR 9010, with polyetherimide (PEI) and erucamide alkyl amide compound. A further comparative example (C) shows use of an alkyl ester compound. Compared to the blend with no alkyl amide compound (example B) examples 6-7 with 0.1 and 0.3% alkyl amide have improved flow while retaining clarity (% T>73%) and low haze (<3%). The alkyl amide mixtures also retain Tg above 180° C. HDT, tensile strength and modulus as well as flexural modulus and strength are retained for the alkyl amide blends. Note the surprising detrimental effects of an added alkyl ester compound (PETS) in comparative example C which is an opaque blend, having reduced % T (33.1%) and increased haze (91.2%) as well as reduced tensile properties. Example 6 had a refractive index of 1.6495. Example 7 had a refractive index of 1.6487.

TABLE 3

|  | Unit | B | C | 6 | 7 |
|---|---|---|---|---|---|
| ITR 9010 | Wt % | 30.0% | 30.0% | 30.0% | 30.0% |
| PEI 1010 | Wt % | 69.8% | 69.5% | 69.7% | 69.5% |
| Aryl phosphite | Wt % | 0.1% | 0.1% | 0.1% | 0.1% |
| Aryl phosphonite | Wt % | 0.1% | 0.1% | 0.1% | 0.1% |
| Erucamide | Wt % |  |  | 0.1% | 0.3% |
| Pentaerythritol Tetrastearate (PETS) | Wt % |  | 0.3% |  |  |
| Tg | deg C. | 194 | 195 | 196 | 189 |
| Transmission | % | 71.8 | 33.1 | 73.3 | 73.1 |
| Yellowness Index |  | 62.5 | 95.9 | 60.9 | 60.2 |
| Haze |  | 2.2 | 91.2 | 2.1 | 2.3 |
| Appearance |  | Transparent | Translucent/Opaque | Transparent | Transparent |
| MFR, 337 C., 6.7 kgf | g/10 min | 53.1 | 59.4 | 62.4 | 71.3 |
| Change in MFR | % | 0% | 11.9% | 17.5% | 34.2% |
| Tensile Strength @ Yield | Psi | 14,224 | 13,991 | 14,325 | 14,398 |
| Tensile Modulus | Psi | 506,531 | 486,212 | 515,239 | 500,726 |
| Tensile Elongation @ break | % | 68 | 24 | 43 | 38 |
| Flex Strength | Psi | 23,512 | 23,657 | 23,720 | 23,803 |
| Flex Modulus | Psi | 468,795 | 471,698 | 472,104 | 474,601 |
| HDT, 66 psi | deg C. | 177 | 176 | 176 | 173 |
| HDT, 264 psi | deg C. | 162 | 163 | 162 | 164 |

Table 4 shows blends of 25 wt % ITR9010 with 59.6 wt % PEI and 15 wt % polyalkylene terephthalates, phosphorus containing stabilizers and 0.2% alkyl amide compound. Example 8 shows a blend with 15% PET (polyethylene terephthalate). Example 9 is a blend with 15% PEN (polyethylene naphthanoate).

The blends are both transparent with a % T greater than 72% with a haze value below 3.5%. The blends show excellent melt flow with a MFR at 337° C. of greater than 140 g/10 min.

TABLE 4

|  | Unit | 8 | 9 |
|---|---|---|---|
| ITR 9010 | Wt % | 25.0% | 25.0% |
| PEI 1010 | Wt % | 59.6% | 59.6% |
| PET | Wt % | 15.0% |  |
| PEN | Wt % |  | 15.0% |
| Aryl phosphite | Wt % | 0.1% | 0.1% |
| Aryl phosphonite | Wt % | 0.1% | 0.1% |
| Erucamide | Wt % | 0.2% | 0.2% |
| MFR, 337 C., 6.7 kgf | g/10 min | 144.8 | 141.4 |
| Tensile Strength @ yield | Psi | 14,000 | 13,100 |
| Tensile Modulus | Psi | 476,800 | 471,700 |
| Tensile Elongation @ break | % | 26 | 46 |
| Flex Strength | Psi | 23,800 | 23,200 |
| Flex Modulus | Psi | 468,800 | 460,100 |
| Izod Impact, notch, 73F | ft-lb/in | 1.06 | 0.85 |
| Izod Impact, Rev. notch, 73F | ft-lb/in | 6.3 | 19.7 |
| Tg (DSC) | deg C. | 170 | 166 |

TABLE 4-continued

|  | Unit | 8 | 9 |
|---|---|---|---|
| HDT, 66 psi, 0.125" | deg C. | 153 | 154 |
| HDT, 264 psi, 0.125" | deg C. | 141 | 141 |
| Transmission | % | 72.9 | 74.7 |
| Yellowness Index |  | 59.2 | 55.6 |
| Haze | % | 3.4 | 2.8 |
| Appearance |  | Transparent | Transparent |

We claim:

1. A composition comprising a miscible polymer blend of:
   a) a resin selected from the group consisting of resorcinol based polyester carbonates, resorcinol based polyarylates and mixtures thereof,
   b) at least one alkyl amide compound with a molecular weight from 250 to 1000 and
   c) one or more polyimide resins,
   wherein said polyester carbonates and polyarylates have at least 50 mole % aryl ester linkages derived from resorcinol, and wherein the miscible polymer blend has a percent transmission, as measured at 3.2 mm, using ASTM method D1003, of greater than or equal to 50%;
   wherein the alkyl amide mold release agent is selected from the structures shown below:

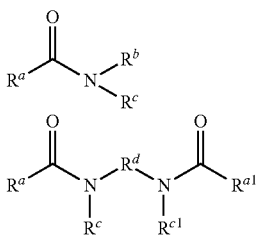

wherein $R^a$ or $R^{a1}$ are a $C_1$ to $C_{30}$ alkyl group and $R^b$, $R^c$ and $R^{c1}$ are independently H or a $C_1$ to $C_{30}$ alkyl group and $R^d$ is a $C_2$ to $C_6$ alkyl group, and
wherein the refractive index, as measured by ASTM method D542, is from about 1.580 to about 1.680.

2. The composition of claim 1 wherein the alkyl amide mold release agent has a molecular weight from about 300 to about 700.

3. The composition of claim 1 wherein the alkyl amide mold release agent is selected from the group consisting of the primary amides, the $C_1$ to $C_6$ N-alkyl amides and the, $C_1$ to $C_6$ secondary amides of; linear or branched $C_{12-36}$ alkyl carboxylic acids, erucic acid, stearic acid, oleic acid, linoleic acid, linolenic acid, myristic acid, palmitic acid, arachidonic acid, behenic acid, lignoceric acid and $C_{6-20}$ bis amides of $C_{2-6}$ alkylene diamines and mixtures containing any of the foregoing.

4. The composition of claim 1 having a melt flow at 337° C., as measured by ASTM method D1238, from about 30 to about 150 g/10 min.

5. The composition of claim 1 wherein the polyimide resin is selected from the group consisting of polyetherimides, polyetherimide sulfones and mixtures thereof.

6. The composition of claim 1 wherein the polyimide is made from
   (a) aryl dianhydrides selected from the group consisting of: bisphenol A dianhydride, oxydiphthalic anhydride, pyromellitic dianhydride, diphthalic anhydride, sulfonyl dianhydride, benzophenone dianhydride and mixtures thereof
   and,
   (b) aryl diamines selected from the group consisting of meta phenylene diamine, para phenylene diamine, diamino diphenyl sulfone, oxydianiline, bis amino phenoxy benzene, bis aminophenoxy biphenyl, bis aminophenyl phenyl sulfone, diamino diphenyl sulfide and mixtures thereof.

7. The composition of claim 1 further comprising a phosphorus containing stabilizer.

8. The composition of claim 7 further comprising a stabilizer selected from the group consisting of phosphites, phosphonites and mixtures thereof.

9. The composition of claim 1 wherein the miscible polymer blend has a percent transmittance, as measured by ASTM D1003, of greater than or equal to about 65%.

10. The composition of claim 1 wherein the miscible polymer blend has a glass transition temperature, as measured by ASTM D3418, of greater than or equal to about 180° C.

11. The composition of claim 1 further comprising one or more alkyl aryl polyester resins.

12. The composition of claim 11 wherein the aryl alky polyester resin is chosen from the group consisting of; polyethylene terephthalate, polybutylene terephthalate, polypropylene terephthalate, polyethylene naphthanoate, polybutylene naphthanoate, polypropylene naphthanoate and mixtures thereof.

13. A composition comprising a miscible polymer blend of:
   a) 1 to 99% by weight of one or more polyetherimide resins,
   b) 99 to 1% by weight of one or more aryl polyester resin containing at least 50 mole% resorcinol linkages,
   c) 0.01 to 5% by weight of at least one alkyl amide compound,
   d) 0 to 40% by weight of one or more aryl alkyl polyesters and
   e) 0 to 2% by weight of one or more phosphorus containing stabilizers.

14. A composition of claim 13 comprising a miscible polymer blend of;
   a) 50 to 99% by weight of one or more polyetherimide resins,
   b) 1 to 50% by weight of one or more aryl polyester carbonate resin containing at least 50 mole% resorcinol linkages,
   c) 0.05 to 3% by weight of at least one alkyl amide compound,
   d) 0 to 40% by weight of one or more aryl alkyl polyester resins and
   e) 0 to 2% by weight of one or more phosphorus containing stabilizers.

15. The composition of claim 1 wherein the resorcinol based polyarylate has the structure shown below:

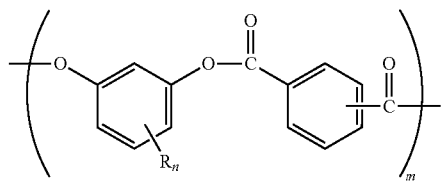

wherein R is at least one of $C_{1-12}$ alkyl, $C_6$-$C_{24}$ aryl, alkyl aryl or halogen, n is 0 to 3 and m is at least about 8.

16. The composition of claim 1 wherein the resorcinol based polyester carbonate resin is a copolymer containing carbonate linkages having the structure shown below:

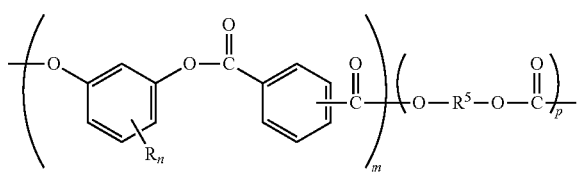

wherein R is at least one of $C_{1-12}$ alkyl, $C_6$-$C_{24}$ aryl, alkyl aryl or halogen, n is 0-3. $R^5$ is at least one divalent organic radical, m is about 4 to 150 and p is about 2 to 200.

17. The composition of claim 16 wherein $R^5$ is derived from a bisphenol compound.

18. The composition of claim 1 further comprising a flame retardant agent selected form the group consisting of: bromine or chlorine containing compounds, sulfonate salts, organo-phosphates or mixtures thereof.

19. An article made from the composition of claim 1.

20. The article of claim 19 that is transparent with a percent transmittance, as measured by ASTM D1003, of greater than or equal to 50%.

21. The article of claim 19 that is transparent with a refractive index, as measured by ASTM D542, is from about 1.580 to about 1.680.

22. The article of claim 19 selected from the group consisting of optical connectors, sensors, filter bowls, sight glasses, films, light pipes and lenses.

* * * * *